(12) United States Patent
Koppuravuri et al.

(10) Patent No.: US 10,810,188 B2
(45) Date of Patent: Oct. 20, 2020

(54) LOAD COMMITTED ISOLATION PROCESSING

(71) Applicant: Teradata US, Inc., Dayton, OH (US)

(72) Inventors: Manjula Koppuravuri, Hasmatpet (IN); James Ronald Carlson, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 348 days.

(21) Appl. No.: 15/825,314

(22) Filed: Nov. 29, 2017

(65) Prior Publication Data

US 2019/0163753 A1 May 30, 2019

(51) Int. Cl.
  *G06F 16/23* (2019.01)
(52) U.S. Cl.
  CPC ...... *G06F 16/2386* (2019.01); *G06F 16/2343* (2019.01)
(58) Field of Classification Search
  None
  See application file for complete search history.

(56) References Cited

U.S. PATENT DOCUMENTS

| 6,678,701 | B1 | 1/2004 | Garth et al. |
| 8,965,838 | B2 | 2/2015 | Garg |
| 9,195,729 | B2 | 11/2015 | Garg |
| 9,378,263 | B2 | 6/2016 | Khimich et al. |
| 2007/0219999 | A1* | 9/2007 | Richey ............ G06F 16/2343 |
| 2008/0235182 | A1 | 9/2008 | Baranczyk et al. |
| 2014/0207740 | A1 | 6/2014 | Narasayya |

OTHER PUBLICATIONS

Teradata—Architecture date unknown [captured by archive.org on Oct. 12, 2016], tutorialspoint.com, https://web.archive.org/web/20161012003106/https://www.tutorialspoint.com/teradata/teradata_architecture.htm.*
Teradata Database SQL Data Manipulation Language date unknown, Teradata Inc, https://docs.teradata.com/reader/2_MC9vCtAJRIKle2Rpb0mA/fQVeuaG4kbz8dUSvBnAp6Q.*

(Continued)

*Primary Examiner* — Jason G Liao
(74) *Attorney, Agent, or Firm* — Schwegman, Lundberg & Woessner, P.A.

(57) ABSTRACT

A database table is defined as a load isolated table (LDI table) that supports a current table version number, multiple row versions, and special load protocols. An isolated loading statement on the LDI table is identified in a Data Manipulation Language (DML), causing the table to be placed in an isolated loading state associated with an incremented new value of the table's current version number. A designated group of DML operations in one or more sessions are then used to load/modify rows in the table, and affected rows are marked with the uncommitted new version. Read-committed queries supported for LDIs ignore the uncommitted rows during an isolated load, seeing only previously committed versions of the rows. When an end isolated loading on the table is identified, the table's version is updated to the new incremented value, causing the newly loaded/modified rows to be recognized as committed by subsequent read-committed queries.

19 Claims, 4 Drawing Sheets

(56) References Cited

OTHER PUBLICATIONS

Teradata Database SQL Request and Transaction Processing date unknown, Teradata Inc., Release 15.10, https://docs.teradata.com/reader/Daz9Bt8GiwSdtthYFn~vdw/CVEauziLwNj2C0zpxVzYbQ.*
Teradata Dataase SQL Data Definition Language Syntax and Examples, Dec. 15, Teradata Inc., https://www.docs.teradata.com/reader/eWpPpcMoLGQcZEoyt5AjEg/sfgVOis81Y2Lr3bUw6WcfA.*
Teradata Workload Management User Guide, Mar. 15, Teradata Inc., https://www.docs.teradata.com/reader/JINbmtOweSRfoGKBDhYiQw/GlwdWcw5P7nOyuvEuGS1aw.*
Teradata Database SQL Request and Transaction Processing date unknown, Teradata Inc., Release 15.00 https://docs.teradata.com/reader/8mHBBLGP88~HK9Auie2QvQ/IpMvysh1BcE9jznnlzhP_dw.*
Teradata Database SQL Functions, Operators, Expressions, and Predicates.*
Teradata Database SQL Functions, Operators, Expressions, and Predicates Mar. 17, https://docs.teradata.com/reader/1DcoER_KpnGTfgPinRAFUw/iiFqNmxurqqTNki1x_CeKw.*
Teradata Database: Release Summary. Release 15.10, B035-1098-151K, Dec. 2015, 72 pages.
Teradata Database: Teradata Workload Management User Guide. Release 15.10, B035-1197-151K, Mar. 2016, 122 pages.
Teradata Database: Teradata Workload Management User Guide. Release 16.10, B035-1197-161K, Jun. 2017, 112 pages.
Teradata Database: SQL Functions, Operators, Expressions, and Predicates. Release 15.10, B035-1145-151K, Mar. 2017, 1218 pages.

\* cited by examiner

LOAD COMMITTED ISOLATION PROCESSING

BACKGROUND

Transaction isolation level defines, among other things, the degree to which read operations on the data are affected by modifying operations on the data by concurrent SQL (Structured Query Language). Depending on isolation levels, the problematic phenomena known as "dirty reads", non-repeatable reads", and "phantom reads" can occur. An "uncommitted read" transaction isolation level allows the phenomena to occur while a "serializable" transaction isolation level disallows any of the phenomena. However, there is a cost associated with the serializable transaction isolation level, which includes reduced concurrency and reduced processing throughput. More desirable would be a "read committed" transaction isolation level that avoids the uncommitted read's problematic phenomena without the serializable read's reduced concurrency. It would furthermore be useful for this read committed level to be defined across a specified group of database transactions that comprise a single "business transaction".

Accordingly, there is a need to provide the read committed isolation level at a business transaction level of a data warehouse, such a read committed isolation level is unavailable in the industry.

Furthermore, a typical data warehouse includes a variety of business transactions that are often beyond simple database transaction boundaries to accommodate many external factors, such as: source system data publishing schedules, data delivery mechanisms, data formats, data processing/validation, and Service Level Agreements (SLAs) for the data warehouse.

Business transaction updates to the warehouse are performed using loads, such as nightly batch-processing loads. Multiple updates to the data can occur as mini-batch loads on the warehouse or simple data modifications as regular warehouse transactions. During these updates, the warehouse allows users to query the data for different reporting and analytical purposes.

Thus, there is a need to provide a mechanism to read rows that are committed during load operations that (a) permits users to obtain the last committed values of the data and (b) improves concurrency between read and write operations.

SUMMARY

Load committed isolation processing is presented.

In an embodiment, a method for load committed isolation processing is provided. A begin load isolation statement is identified in instructions for a table. The user-defined table is set to a load state and operations defined in the instructions are processed against rows of the table while maintaining the rows as being uncommitted and the table in the load state. Versions of the rows are updated to the table after processing the operations and the table is committed for loading when an end load isolation statement is encountered within the instructions.

DETAILED DESCRIPTION

Figure 1:
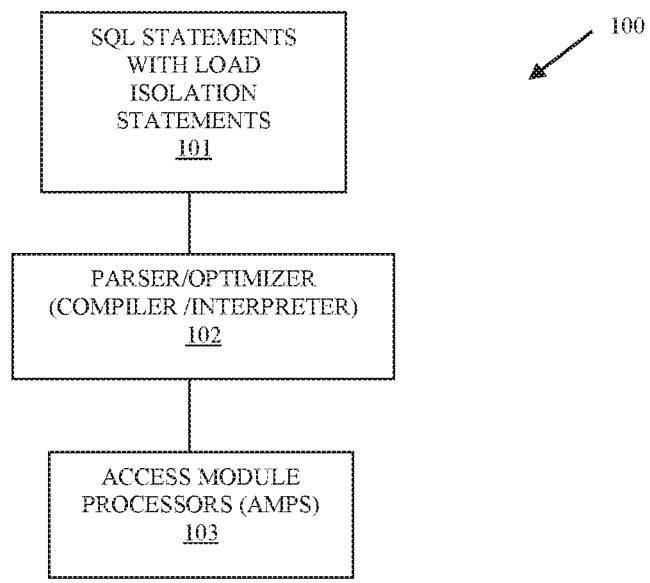
FIG. 1 is a diagram of a system for performing load committed isolation processing, according to an embodiment.

Various embodiments depicted herein are implemented as one or more software modules, which are programmed within memory and/or non-transitory computer-readable storage media and executed on one or more processing devices (having memory, storage, network connections, one or more processors, etc.).

As presented herein, a mechanism is provided for "load committed isolation processing", which embodies a type of read committed isolation level referred to as a "load committed isolation level" or "load isolation level".

Embodiments described herein provide processing for a read committed isolation level against a table of a database through new SQL commands and SQL processing to support the new commands. Furthermore, the processing is supported across individual transactions, multiple transactions in single sessions, and multiple transactions in multiple sessions.

As used herein, a "transaction" is a unit of processing within a Database Management System (DBMS) against a database or data warehouse. The transaction is atomic, consistent, isolated, and durable.

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

To permit committed reads, rows record the commit property. A table is defined to hold the commit property during initialization/definition, as used here such a table is called a Load-Isolated Table (LDI table).

A load operation can either (a) be limited to a single transaction, (b) be performed in multiple transactions within a session, or (c) be performed in multiple transactions across multiple sessions. New SQL syntax is provided to identify the type of load operation that is being performed. A paired "Query_Band" value provides a mechanism for linking multisession loads and single session loads together (each independent session having the paired value for the Query_Band). In singlesession_load, the session issues the Query_Band after the BEGIN in order to start loading. Additionally, new SQL syntax for "transaction_load" identifies a single transaction load operation; "singlesession_load" identifies a load operation spanning multiple transactions within a single session; and "multisession_load" identifies a load operation for multiple sessions (used with the Query_Band and its paired value). That is, the multisession_load identifies the load sessions for a given LDI table based on the value defined in the Query_Band: "LDILoadGroup" (LDILoadGroup being a paired value to the Query_Band). There is also new SQL syntax for transaction_load identifying a single transaction load operation; singlesession_load identifying a load operation spanning multiple transactions within a single session (used with the Query_Band and its paired value); and multisession_load identifying a load operation for multiple sessions (used with the Query_Band and its paired value). That is, the singlesession_load/multisession_load identifies the load sessions for a given LDI table based on the value defined in the Query_Band: "LDI-LoadGroup" (LDILoadGroup being a paired value to the Query_Band). It is also noted that a singlesession_load marks the load operation with the session.

All rows modified during the load operation are considered load uncommitted rows and the table is considered to be in "load state" until the load operation is committed. It is to be noted that the "uncommitted rows" does not imply that the rows can be rolled back. The load isolation processing provided herein does not introduce any changed "transaction' behavior" within the database. That is, all existing transaction properties of the database remain available and unchanged with the processing presented herein. However, the rows are considered "uncommitted" as far as the load operation is considered, which means the rows can be "load isolated."

Multisession Load Processing: New SQL syntax is introduced to demarcate the beginning of a multisession load operation and is identified in a SQL "BEGIN ISOLATED LOADING" statement with QUERY_BAND LDILoadGroup. This identifies the beginning of the QUERYBAND_load/multisession_load operation for a table specified by the user in the SQL. When the statement is executed, the table is marked as being in a load state. The load state is associated with the specified LDILoadGroup value (paired value with the QUERY_BAND). Subsequently, all modifications on the table in all sessions with a matching value in the session's isolated Query_Band name:value pair for the LDILoadGroup name will be considered part of this load operation. The different sessions/transactions will continue to be processed concurrently in the database where each transaction waits for the lock to modify the table, etc., and transactions can be committed or rolled-back in a normal manner by the database. The table is marked as being in a load state until the time the load is committed using a new SQL "END ISOLATED LOADING" statement. One master session can control the load operation or provide a decentralized control on the load operation using this technique. The user-defined application (SQL code) may decide appropriate control mechanisms for load commits depending on user-defined business rules and/or user-defined application design for table modifications.

Single Session Load Processing: A new BEGIN ISOLATED LOADING statement with a singlesession_load option marks the session load operation for a table. A table is marked in load state when this command is issued (processed from the user SQL). The load state is associated with the session issuing this command. Subsequently, all modifications on the table in the same session are considered part of this load operation. The table will be marked as being in a load state until the time the load is committed, which is identified in the SQL by the user using the END ISOLATED LOADING statement. This processing may be adopted when multiple transactions are to be exercised to mark a load operation. This processing may also be adopted if the modifications performed on the LDI tables are not "bulk" operations but must be load isolated by executing all such transactions after BEGIN ISOLATED LOADING command and committing the load using an END ISOLATED LOADING command.

Transaction Load Processing: A first modification in a transaction begins a transaction_load on the table. The table is marked for load associated with the session and transaction. When the transaction commits (with an END TRANSACTION statement or completion of a single request implicit transaction), the load operation is committed. If transaction is rolled-back, the load operation is rolled-back.

To provide a data refresh in the single/multiple session based load, a new SQL "CHECKPOINT ISOLATED LOADING" statement/command is provided. The CHECKPOINT ISOLATED LOADING statement is processed as if an END ISOLATED LOADING was processed and immediately followed by a BEGIN ISOLATED LOADING statement.

In order to group the multiple tables that are related and loaded in business transactions, the SQL commands permit a list of tables instead of a single table. Thus, the load operations may be grouped together.

The BEGIN ISOLATED LOADING and END ISOLATED LOADING operations are logged in a new Data Dictionary (DD) table in order to permit the operations to sustain a database restart. Thus, reconnected sessions can continue to load the table or a group of tables with this approach.

The processing described above and below is unique because it permits:

(1) isolating a business transaction in a manner that is against typical SQL transaction boundaries;
(2) grouping all related tables within the load operation in order to permit reporting queries to view consistent data across the related tables, providing flexibility to DB Administrators (DBAs);
(3) identifying the load sessions using a Query_Band approach; and
(4) allowing a master session to control the start and end of load operation for multiple session, thus providing different load sessions to modify the tables in a concurrent manner.

FIG. 1 is a diagram of a database processing system 100 for performing isolating loading within a database as described above.

The system 100 is shown in greatly simplified form with just those components necessary for comprehension of embodiments of the invention presented. It is to be understood that additional components or subcomponents may be used without departing from the teachings presented herein.

Initially, a user (such as a DBA) provides an application in SQL statements with the new SQL for BEGIN ISOLATED LOADING, END ISOLATED LOADING, and/or CHECKPOINT ISOLATED LOADING (hereinafter statements 101).

The BEGIN ISOLATED LOADING and CHECKPOINT ISOLATED LOADING statements are paired with a QUERY_BAND LDILoadGroup key in the statements 101.

The parser/optimizer (compiler/interpreter) 102 (hereinafter just "parser 102." The parser 102 identifies the new SQL syntax and statements for the BEGIN ISOLATED LOADING or CHECKPOINT ISOLATED LOADING and generates Access Module Processor (AMP) instructions for achieving load isolating processing on the statements 101 for the corresponding table identified in the statements 101 using an LDI table (as discussed above).

When the AMP 103 executes the BEGIN ISOLATED LOADING statement a short-term lock is placed on the table (or multiple tables when used) for concurrency protection while the table is put into an isolated loading state. The short-term lock is dropped when BEGIN ISOLATED LOADING completes and the load operation is in progress. The loading sessions place the usual write locks on the table associated with the Data Manipulation Language (DML) operations defined in the statements 101 for loading data to the table. At the end of the load, the END ISOLATED loading statement generates another short-term lock on the table, similar to what was done for the BEGIN ISOLATED LOADING, to protect the transition out of the isolated loading state for the table.

Protection against dirty reads during the load does not use locks at all. Instead, the reads are achieved under an access lock that allows the reads to process on the AMPs 103 concurrently with the write locks used for data load operations. The dirty read protection is provided by access logic specific to the LDI table, which includes a version-numbering scheme in the rows to distinguish between previously committed rows (which are visible during the read) and uncommitted rows currently being loaded (which are invisible and therefore ignored). The LDI table maintains versions of the rows through version-numbering so that previously committed as well as uncommitted versions of any given row can be obtained as needed.

Specifically, the parser 102 identifies from the statements 101 SQL SELECT operations performed on the LDI table and generates access lock instructions for read-committed (or read-uncommitted) access, or read lock instructions for serialized access. Next, the parser 102 generates retrieve/join instructions with new evaluation instructions as needed for performing read-committed access.

The parser 102 also identifies from the statements 101 any user-defined DML statements being performed on the LDI table and the parser 102 generates appropriate write lock instructions for isolated loads or exclusive lock instructions for other cases present in the DML statements. (The exclusive lock is used to block against access locks used for read-committed operations, effectively converting then to serialized accesses.)

The AMPs 103 execute the newly generated instructions produced by the parser 102 and update data dictionary (DD) entries for the LDI table state changes. The AMPs 103 also execute new read-committed evaluation instructions produced by the parser 102 for accessing rows in the LDI table.

During load isolation processing, the row-versioning maintained for the LDI table provides a mechanism for distinguishing between previously committed rows and newly loaded (or modified) uncommitted rows within the LDI table itself. This is initiated and maintained on the BEGIN ISOLATED LOADING by incrementing the version number for newly loaded rows. The END ISOLATED LOADING generates the proper committed version number for the user's table(s) committed version number.

A DBA or database user drafts DML applications, such as SQL applications to include the new enhanced DML commands discussed above. Some sample uses of the commands appear as follows:

For the BEGIN ISOLATED LOADING:
BEGIN ISOLATED LOADING ON DB_Name. Table_Name USING QUERY_BAND 'LDILoadGroup=Group_Name;' IN MULTIPLE SESSION;

The DB_Name and Table_Name are supplied by the user for the database (DB_Name) and table (Table_Name) within the database. The Group_Name value for the LDILoadGroup is a value to match against other sessions when the IN MULTIPLE SESSION option is specified.

It is noted that a list of DB_Name.Table_Name table references can be supplied, such that more than a single table can be processed for the isolated loading level processing provided herein. Moreover, before the BEGIN ISOLATED LOADING statement is processed the LDILoadGroup value must be either not set at all or else set to NONE for the session.

The LDILoadGroup QUERY BAND is set to control multiple concurrent session isolated loading. It follows the BEGIN ISOLATED LOADING statement with the specified load group value and can be set as follows:
SET QUERY_BAND='LDILoadGroup=Group_Name;' FOR SESSION;
Or the QUERY_BAND can be removed from the session with:
SET QUERY_BAND='LDILoadGroup=NONE;' FOR SESSION;

The CHECKPOINT ISOLATED LOADING sets a checkpoint for the explicit load operation and commits the data that has been loaded up to that point.
CHECKPOINT ISOLATED LOADING FOR QUERY_BAND 'LDILoadGroup=Group_Name;';

When the CHECKPOINT ISOLATED LOADING statement is processed, the data that has been loaded up to that point in the session, or by all sessions in a multisession load operation, is committed and becomes available for concurrent read operations. This operation can be used to enable recently loaded data to be available for concurrent read operations while the isolated load operation continues.

END ISOLATED LOADING ends the explicit concurrent isolated load operation for the specified load group value.
END ISOLATED LOADING FOR QUERY_BAND 'LDILoadGroup=Group_Name;';

It is to be noted that the new DML statements/commands can be other names or in other formats from that which has been described. However, the processing initiated by the new DML statements/commands is performed in the same manner as discussed herein. For example, BEGIN ISOLATED LOADING may be BL, CHECKPOINT ISOLATED LOADING may be CK, and END ISOLATED LOADING may be EL. Whatever the nomenclature used for the enhanced DML, the processing described herein performs isolated loading.

These and other embodiments are now discussed with reference to the FIGS. 2-4.

Figure 2:
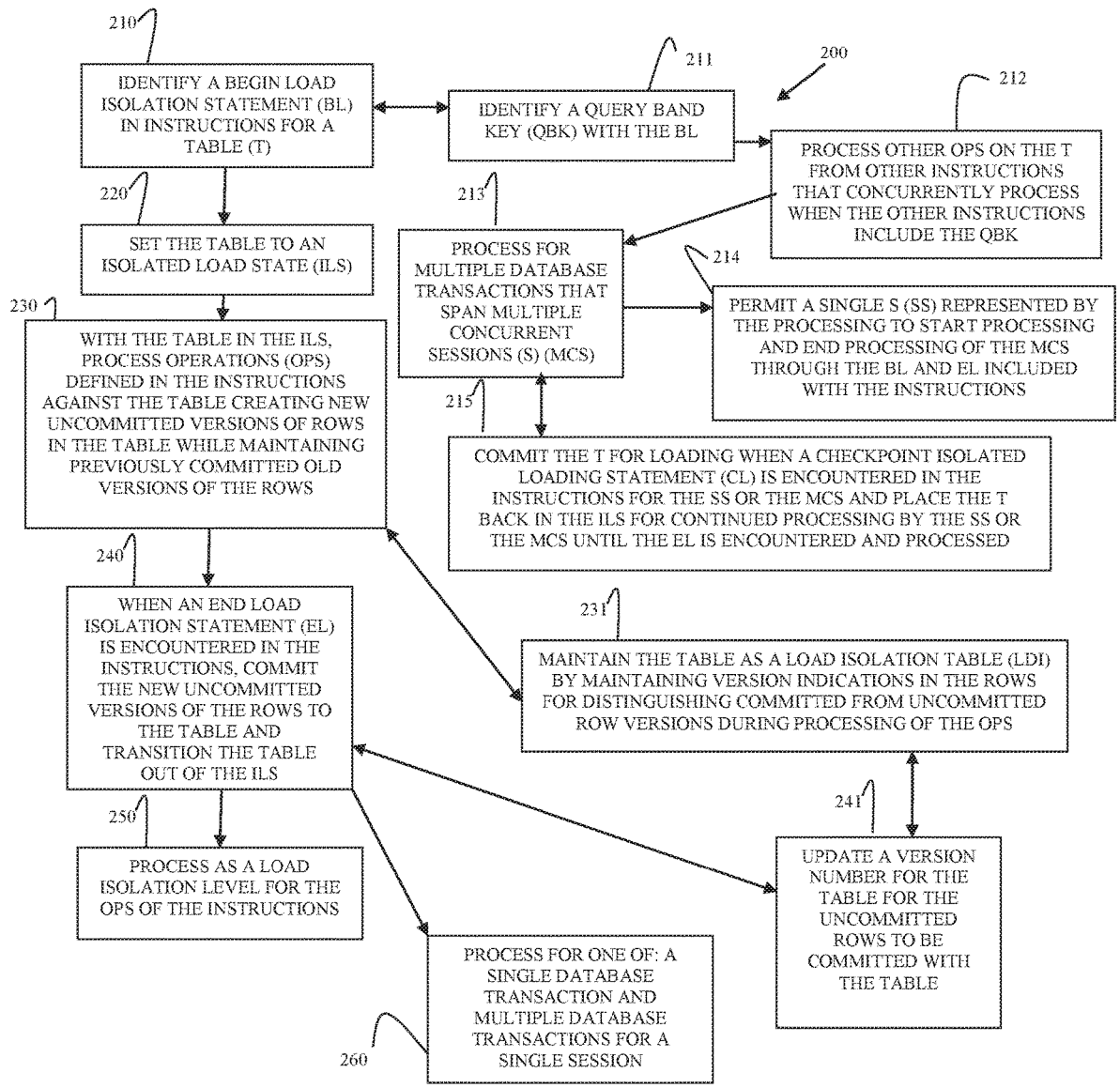
FIG. 2 is a diagram of a method for load committed isolation processing, according to an example embodiment.

FIG. 2 is a diagram of a method 200 for load committed isolation processing, according to an example embodiment. The method 200 is implemented as one or more software modules referred to as "an isolated loader". The isolated loader is executable instructions that are programmed within memory or a non-transitory computer-readable medium and executed by one or more hardware processors. The isolated loader has access to one or more network connections during processing, which can be wired, wireless, or a combination of wired and wireless.

In an embodiment, the isolated loader is implemented within a data warehouse across one or more physical devices or nodes for execution over a network connection.

In an embodiment, the isolated loader is all or some combination of the processing discussed for the parser 102 and/or the AMPs 103.

At 210, the isolated loader identifies a BEGIN ISOLATED LOADING (BL) statement/command in instructions for a table. The instructions are provided by a DBA or user as a DML application for processing against a database/warehouse.

According to an embodiment, at 211, the isolated loader identifies a QUERY BAND (QB) key with the BL.

In an embodiment of 211 and at 212, the isolated loader processes other operations/commands on the table from other instructions that concurrently process when the other instructions include the QB key.

In an embodiment of 212 and at 213, the isolated loader processes for multiple database transactions that span multiple concurrent sessions.

In an embodiment of 213 and at 214, the isolated loader permits a single session represented by the instructions to start processing and end processing of the multiple concurrent session through the BL and an END ISOLATED LOADING statement (EL) included with the instructions. In an embodiment, the instructions being processed by the isolated loader initiates the BL and a different one of the other multiple concurrent session provides the EL.

In an embodiment of 213 and at 215, the isolated loader commits the table for loading when a CHECKPOINT ISOLATED LOADING statement (CL) is encountered in the instructions for the single session or the multiple concurrent sessions. Immediately after committing the table for loading, the isolated loader places the table back into the isolated load state for continued processing by the single session or the multiple concurrent sessions until the EL is encountered and processed.

At 220, the isolated loader sets the table to an isolated load state within the database/warehouse.

At 230 with the table in the isolated load state, the isolated loader processes operations/commands defined in the instructions against the table creating new uncommitted versions of rows in the table while maintaining previously committed old versions of the rows.

According to an embodiment, at 231, the isolated loader maintains the table as a load isolation table (LDI) by maintaining version indications in the rows for distinguishing committed from uncommitted row versions during processing of the operations for the instructions.

At 240 when an EL is encountered in the instructions, the isolated loader commits the new uncommitted versions of the rows to the table and transitions the table out of the isolated load state.

In an embodiment of 231 and 240, at 241, the isolated loader updates a version number for the table for the uncommitted rows to be committed with the table.

In an embodiment, at 250, the isolated loader processes as support for a load isolation level for the operations of the instructions.

In an embodiment, at 260, the isolated loader processes for one of: a single database transaction and multiple database transactions for a single session. It is noted that the processing of the isolated loader discussed above at 211-215 support the isolated loader processing for multiple transactions of multiple concurrent sessions through the QB key.

Figure 3:
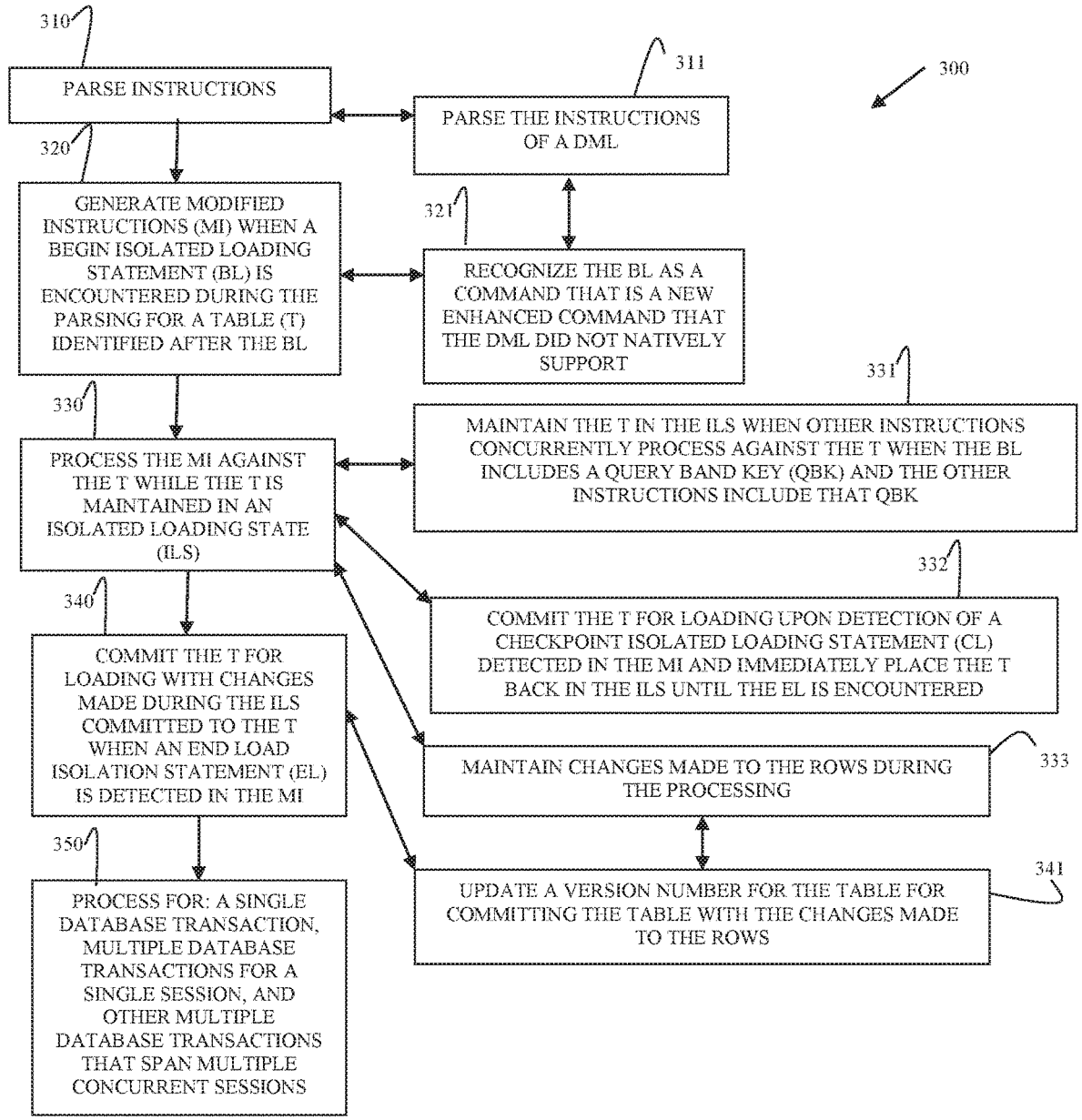
FIG. 3 is a diagram of another method for load committed isolation processing, according to an example embodiment.

FIG. 3 is a diagram of another method 200 for load committed isolation processing, according to an example embodiment. The method 200 is implemented as one or more software modules referred to as a "loader". The loader is executable instructions that are programmed within a memory or a non-transitory computer-readable medium and executed by one or more hardware processors. The loader has access to one or more network connections during processing, which can be wired, wireless, or a combination of wired and wireless.

The loader presents another and in some ways enhanced perspective of the processing discussed above with the FIGS. 1 and 2

In an embodiment, the loader is all or some combination of: the parser 102, the AMPS 103, and/or the method 200.

At 310, the loader parses instructions for execution within a database/warehouse.

In an embodiment, at 311, the loader parses the instructions of a DML application, such as a coding application provided by a DBA in SQL.

At 320, the loader generates modified instructions when a BEGIN ISOLATED LOADING statement (BL) is encountered during the parsing for a table identified after the BL.

In an embodiment of 311 and 320, at 321, the loader recognizes the BL as a command that is a new enhanced command that the DML did not natively support. As discussed above, the BL command and isolated loading level processing is enhanced and provided through newly added DML statements/commands.

At 330, the loader processes the modified instructions against the table while the table is maintained in an isolated loading state.

In an embodiment, at 331, the loader maintains the table in the isolated loading state when other instructions concurrently process against the table when the BL includes a QUERY BAND key (QBK) and the other instructions include the same QBK.

In an embodiment, at 332, the loader commits the table for loading upon detection of a CHECKPOINT ISOLATED LOADING statement (CK) and the loader immediately thereafter places the table back into the isolated loading state until the END ISOLATED LOADING statement (EL) is encountered within the instructions.

According to an embodiment, at 333, the loader maintains changes made to the rows during the processing.

At 340, the loader commits the table for loading in the database/warehouse with changes made during the isolated loading state and committed to the table when the EL is detected in the modified instructions. The EL is in the instructions originally but modified processing ensures that the EL is encountered and processed within the modified instructions when appropriate to do so.

In an embodiment of 333 and 340, at 341, the loader updates a version number for the table for committing the table with the changes made to the rows.

According to an embodiment, at 350, the loader processes for a single database transaction, multiple database transactions for a single session, and other multiple database transactions that span multiple concurrent sessions.

Figure 4:
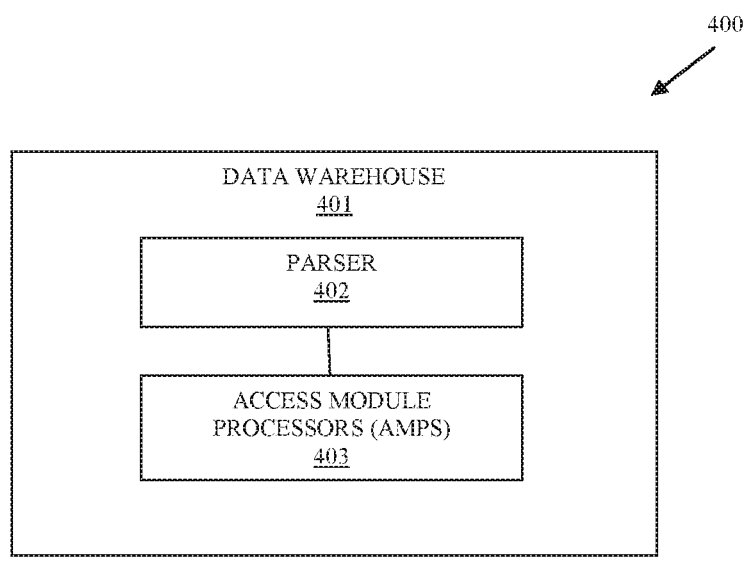
FIG. 4 is a diagram of another system for performing load committed isolation processing, according to an example embodiment.

FIG. 4 is a diagram of another database processing system 400 for performing isolating loading within a database. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes a parser/compiler/interpreter (parser 402), and AMPs 403 distributed on nodes of a network.

The parser 402 is configured to: i) execute on at least one hardware processor of the network ii) parse a DML application; iii) generate instructions to perform a load isolation level on one or more tables in response to a begin isolated loading statement detected in the DML application that maintains the one or more tables in an isolated loading state until an end isolated loading statement is detected in the DML application, and iv) provided the instructions to the AMPS for executing against rows of the one or more tables in the data warehouse 401 on hardware processors of the nodes.

In an embodiment, the parser 402 is further configured, in iii), to: generate instructions to support multiple DML applications to concurrently process the load isolation level on the one or more tables that span multiple data warehouse transaction from multiple concurrent sessions with the data warehouse 401.

It is noted that although the discussion discussed a single table for purposes of illustration, the processing described herein also performs load isolation on two or more tables for the various embodiments discussed herein and above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
    identifying a begin load isolation statement in instructions for a table;
    setting the table to an isolated load state;
    with the table in the isolated load state, processing operations defined in the instructions against the table creating new uncommitted versions of rows in the table while maintaining previously committed old versions of the rows; and
    when an end load isolation statement is encountered within the instructions, committing the new uncommitted versions of the rows to the table and transitioning the table out of the isolated load state;
    wherein the processing further includes committing the table for loading upon detection of a checkpoint isolated loading statement in the instructions and immediately placing the table back into the isolated load state until the end load isolation statement is encountered.

2. The method of claim 1 further comprising, processing the operations as a load isolation level for the operations of the instructions.

3. The method of claim 1 further comprising, processing the operations for one of: a single database transaction and multiple database transactions for a single session.

4. The method of claim 1, wherein identifying further includes identifying a query band key with the begin load isolation statement.

5. The method of claim 4 further comprising, processing other operations on the table from other instructions that concurrently process when the other instructions include the query band key.

6. The method of claim 5 further comprising, processing the operations for multiple database transactions that span multiple concurrent sessions.

7. The method of claim 6 further comprising, permitting a single session represented by the operations to control start processing and end processing of the multiple concurrent sessions through the begin load isolation statement and end load isolation statement included with the instructions.

8. The method of claim 6, wherein processing further includes committing the table for loading when the checkpoint isolated loading statement is encountered in the instructions or the other instructions for the single session or the multiple concurrent sessions and placing the table back in the isolated load state after committing the table for continued processing by the single session or the multiple concurrent sessions until the end load isolation statement is encountered and processed.

9. The method of claim 1, wherein processing further includes maintaining the table as a load isolation table by maintaining version indications in the rows for distinguishing committed from uncommitted row versions during processing of the operations.

10. The method of claim 9, wherein committing further includes updating a version number for the table for the uncommitted rows to be committed with the table.

11. A method, comprising:
    parsing instructions;
    generating modified instructions when a begin isolated loading statement is encountered during the parsing for a table identified after the begin isolated loading statement;
    processing the modified instructions against the table while the table is maintained in an isolated loading state; and
    committing the table for loading with changes made during the isolated loading state committed to the table when an end isolated loading statement is detected in the modified instructions;
    wherein the processing further includes committing the table for loading upon detection of a checkpoint isolated loading statement in the modified instructions and immediately placing the table back into the isolated loading state until the end isolated loading statement is encountered.

12. The method of claim 11, wherein parsing further includes parsing the instructions of a Data Manipulation Language (DML).

13. The method of claim 12, wherein generating further includes recognizing the begin isolated loading statement as a command that is a command that the DML did not natively support.

14. The method of claim 11, wherein processing further includes maintaining the table in the isolated loading state when other instructions concurrently process against the table when the begin isolated loading statement includes a query band key and the other instructions include that query band key.

15. The method of claim 11, wherein processing further includes maintaining changes made to the rows during the processing of the modified instructions.

16. The method of claim 15, wherein committing further includes updating a version number for the table for committing the table with the changes made to the rows.

17. The method of claim 11 further includes, processing the modified instructions for: a single database transaction, multiple database transactions of a single session, and other multiple database transactions that span multiple concurrent sessions.

18. A system, comprising:
    a data warehouse including:
    a parser; and
    access module processors distributed on nodes of a network;
    wherein the parser is configured to: i) execute on at least one hardware processor of the network ii) parse a Data Manipulation Language (DML) application; iii) generate instructions to perform a load isolation level on one or more tables in response to a begin isolated loading statement detected in the DML application that maintains the one or more tables in an isolated loading state until an end isolated loading statement is detected in the DML application, and iv) provide the instructions to the access module processors for executing against rows of the one or more tables in the data warehouse on hardware processors of the nodes, and wherein the one or more tables are committed for loading upon detection of a checkpoint isolated loading statement in the DML application and the one or more tables are immediately placed back into the isolated loading state until the end isolated loading statement is detected in the DML application.

19. The apparatus of claim 18, wherein the processor is further configured, in iii), to: generate the instructions to support multiple DML applications to concurrently process the load isolation level on the one or more tables that span multiple data warehouse transactions from multiple concurrent sessions with the data warehouse.

* * * * *